United States Patent [19]

Tsuchida et al.

[11] 4,237,203

[45] Dec. 2, 1980

[54] RUPTURABLE SAFETY SEALING GASKET OF CELL

[75] Inventors: Takashi Tsuchida, Kosai; Kenichi Shinoda, Toyohashi; Kohei Yamamoto, Kosai; Toshio Suzuki, Shimozuma, all of Japan

[73] Assignee: Fuji Electrochemical Co., Ltd., Tokyo, Japan

[21] Appl. No.: 965,708

[22] Filed: Nov. 30, 1978

[30] Foreign Application Priority Data

Nov. 30, 1977 [JP] Japan .................................. 52-143621

[51] Int. Cl.³ ............................................ H01M 2/12
[52] U.S. Cl. ............................ 429/122; 277/DIG. 10; 429/56
[58] Field of Search ......................... 429/56, 185, 122; 277/212 FB, DIG. 10

[56] References Cited

U.S. PATENT DOCUMENTS

| 2,525,436 | 10/1950 | Williams | 429/56 |
|---|---|---|---|
| 3,219,488 | 11/1965 | Southworth | 429/56 |
| 3,314,824 | 4/1967 | Spanur | 429/56 |
| 4,125,685 | 11/1978 | Bloom et al. | 429/122 |

*Primary Examiner*—Robert I. Smith
*Attorney, Agent, or Firm*—Wenderoth, Lind & Ponack

[57] ABSTRACT

In a gasket of a cell comprising a marginal portion, an annular center portion and an intermediate portion integrally formed with each other, the intermediate portion of the gasket has an inwardly projecting annular thin wall surrounding the annular center portion with an annular space therebetween. The annular thin wall has, generally, an inverted frusto-conical shape and is provided at the outer surface thereof with an annular horizontal groove and a vertical groove intersecting with each other.

2 Claims, 2 Drawing Figures

RUPTURABLE SAFETY SEALING GASKET OF CELL

BACKGROUND OF THE INVENTION

This invention relates to a rupturable safety sealing gasket for a cell which normally prevents electrolyte from leaking therethrough but which allows a gas abnormally developed in the cell to be released therefrom by rupture of the gasket.

A sealing gasket of this type is known as shown in Japanese Patent Publication No. 37-15358, in which a part of the gasket is made thin enough to allow the gas normally developed in the cell to be diffused therethrough. However, when the internal gas pressure of the cell is abnormally increased, the thin part of the gasket is ruptured to release the gas therethrough and to prevent explosion of the cell.

In spite of such proposal as above, however, since the sealing gasket is practically formed by injection molding of thermoplastic resin, such as polyethylene, polypropylene, or nylon, the thickness of the thin part of the gasket could not be made less than about 0.25 mm, because the fluidity of the resin is obstructed by a thickness of less than 0.25 mm, which causes the production of inferior cells. Although a gasket having a thickness of the thin part of about 0.25 mm may be used in a relatively small cell such as AA—size, it cannot be used in larger cells such as D—size and C—size, because the gasket cannot be ruptured until the internal gas pressure is built up to 50 kg/cm$^2$, which is high enough to cause explosion of the cell itself.

Another proposal has been made as shown in U.S. Pat No. 3,314,824 in which a sharp member is provided in the cell adjacent to a gasket to puncture the latter when the internal gas pressure is abnormally increased in the cell. This proposed structure, however, requires the additional sharp member, to thereby increase the production costs of the cell, and also causes a reduction of the effective internal volume of the cell.

SUMMARY OF THE INVENTION

Accordingly, an object of the present invention is to provide a sealing gasket of a cell wherein the gasket is rupturable by internal gas pressure of less than 40 kg/cm$^2$ even though the thickness of the thin part of the gasket is in the range of from 0.25 mm to 0.35 mm.

Another object of the present invention is to provide a sealing gasket of a cell wherein the gasket is rupturable by internal gas pressure of the cell without the aid of a sharp member.

According to the present invention, a rupturable safety sealing gasket of a cell is provided which comprises a circumferential marginal portion constricted between a free end of a metal casing and a peripheral edge of a terminal plate, an annular center portion through which a collector metal rod penetrates, and an intermediate portion integrally connecting the marginal portion with the center portion. The intermediate portion of the gasket has an inwardly projecting annular thin wall surrounding the annular center portion of the gasket with an annular space therebetween. The annular thin wall of the gasket has, generally, an inverted frusto-conical shape and is provided at the outer surface thereof with an annular horizontal groove and a vertical groove intersecting with each other.

Preferably, the annular thin wall of the gasket has a first inner frusto-conical section and a second outer frusto-conical section integrally formed with each other. In this case, the annular horizontal groove is formed in the vicinity of the juncture of the first and second frusto-conical sections.

Other objects and features of the present invention will become apparent from the following detailed description of a preferred embodiment of the present invention shown in the accompanying drawings, in which:

DETAILED DESCRIPTION OF THE PREFERRED EMBODIMENT

Figure 1:
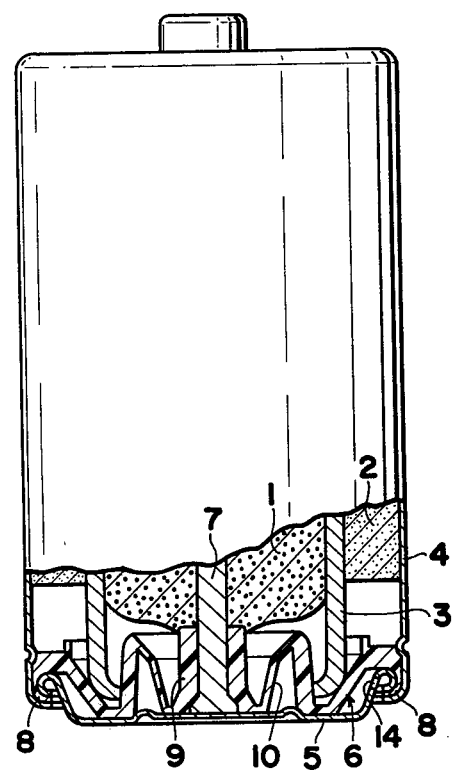
FIG. 1 is a partially sectioned view of an alkaline cell using a sealing gasket of the present invention.

Referring to FIG. 1, an alkalline cell is shown which comprises an anode compositon 1, a cathode composition 2, and a separator 3, all being contained in a metal casing 4. The metal casing 4 is closed at one open end thereof by a dish-shaped terminal plate 5 and a sealing gasket 6. The terminal plate 5 is electrically connected to the anode composition 1 by a collector metal rod 7 penetrating through the sealing gasket 6 and welded to the terminal plate.

The sealing gasket 6 of the present invention has a circumferential marginal portion 8 which is constricted between the free end of the metal casing 4 and a peripheral edge of the terminal plate 5. The center portion of the gasket has an annular collar 9 inwardly extending into the cell and tightly fitted around the collector metal rod 7. The marginal portion 8 and the annular collar 9 of the gasket 6 are integrally formed with an intermediate portion 10 of the gasket.

The intermediate portion 10 of the gasket 6 has an inwardly projecting annular thin wall 10a surrounding the annular collar 9 with an annular space therebetween. The annular thin wall 10a is connected at the outer or lower part thereof with the annular collar 9 and at the inner or upper part thereof with an annular thick wall 10b of the gasket. Therefore, another annular space is defined between the thin and thick walls 10a and 10b of the gasket 6.

The annular thin wall 10a of the gasket 6 has, generally, an inverted frusto-conical shape. Preferably, the annular thin wall 10a is formed of two frusto-conical sections, i.e. a first inner or upper frusto-conical section 10c and a second outer or lower frusto-conical section 10d, integrally formed with each other. According to the present invention, the annular thin wall 10a is provided at the outer surface thereof with an annular horizontal or circumferential groove 11 and a vertical or axial groove 12 intersecting with each other.

Preferably, the horizontal groove 11 is formed in the vicinity of the juncture 10e of the first and second frusto-conical sections 10c and 10d, respectively.

The intersection of the horizontal and vertical grooves 11 and 12 may be a cross-shape or a T-shape. Preferably, one horizontal groove 11 is provided, while there may be provided an increased number up to two or three vertical grooves 10.

The sealing gasket 6 also has a groove 13 at the outer surface thereof, with which the terminal plate 5 contacts, to allow a gas having ruptured the sealing gasket to pass therethrough and to be released through vent hole 14 formed in the terminal plate 5.

Now, reference is made to an internal gas pressure applied to the sealing gasket. Generally, when a constant gas pressure p is applied to the internal hollow space of a conical body having an apex angle of $2\alpha$, a stress in the meridian direction $\sigma\theta$ at a latitudinal circle having a radius of r is shown by an expression of $pr/2t \cos \alpha$, while a stress in the circumferential direction $\sigma\phi$ at the latitudinal circle having a radius of r is shown by an expression of $pr/t \cos \alpha$, wherein t is the thickness of the wall of the conical body. As it is known, the value of $\cos \alpha$ is "1" when $2\alpha$ is "0" and decreases as $2\alpha$ becomes 90°. Accordingly, the rupture of the sealing gasket 6 occurs rather by the stress $\sigma\phi$ in the circumferential direction than by the stress $\sigma\theta$ in the meridian direction. In order to rupture the gasket at a lower internal pressure, the apex angle of the conical body is to be increased.

The vertical groove 12 formed in the meridian direction of the gasket 6 serves to concentrate the circumferential stress $\sigma\theta$ to this grooved portion. However, it could be noted by experiments that the gasket having the vertical groove or grooves only but no horizontal groove could not be ruptured at a desired relatively low internal pressure in case the gasket was used in C size and D size cells. By forming the horizontal and vertical grooves 11 and 12 in the gasket to intersect with each other and to have the thickness of the gasket about 0.25 mm–0.35 mm at the grooved portions, it became possible to rupture the gasket without fail by a relatively low internal gas pressure of 20–30 kg/cm$^2$. The reason is that not only the vertically grooved portion but also the horizontally grooved portion of the gasket are expanded outwardly, whereby the gasket becomes much more expansible at the intersection of these grooves and the stress by the internal gas pressure is much concentrated to this intersection.

Further, in order to facilitate the rupture of the gasket by the expansion of the grooved intersection therein, it is important that the thin wall 10a of the gasket, in which the intersecting grooves 11 and 12 are formed, is supported by thicker parts of the gasket. In the present embodiment, the annular thin wall 10a is integrally supported by the annular collar 9 and the thick wall 10b, both of which have a sufficient rigidity not to be flexed by the internal gas pressure in the cell.

The frusto-conical shape of the thin wall of the present gasket is also very important to facilitate the rupture of the gasket at a relatively low desired internal gas pressure. In the illustrated embodiment, the first frusto-conical section 10c has an imaginary apex angle larger than that of the second frusto-conical section 10d, so that when the internal gas pressure in the cell is abnormally increased, both of the frusto-conical sections 10c and 10d flex outwardly at the grooved portions. By this outward flexion of the frusto-conical sections 10c and 10d, the horizontal groove 11 at the juncture thereof is stretched vertically to become wider, whereby the groove 11 becomes more rupturable.

When the gasket 6 is ruptured by the abnormally developed internal gas pressure, the gas passes through the other groove 13 adjacent to the inner surface of the terminal plate 5 and is released to the outside of the cell through the vent hole 14 in the terminal plate 5.

Figure 2:
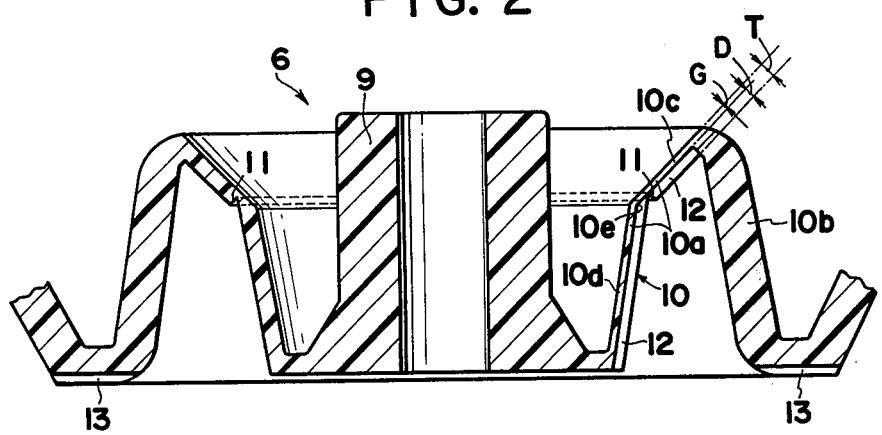
FIG. 2 is an enlarged vertical sectional view showing the same sealing gasket as used in FIG. 1.

The results of tests are shown in the following tables. In the tests, gaskets having the shape shown in the drawings were used, in which Gasket (A) in the table had only a horizontal groove, Gasket (B) had a horizontal groove and a vertical groove intersecting with each other in the shape of a "T", and Gasket (C) had a horizontal groove and a vertical groove crossed with each other. The thickness (T) of the gasket at the thin part 10a, on which the groove or grooves were formed, was 0.60 mm and the depth (D) of the groove was varied to 0.35 mm and 0.25 mm to provide a thin rupturable grooved portion (G) of 0.25 mm and 0.35 mm, respectively. The above symbols (T), (D) and (G) are shown in FIG. 2. The horizontal groove was formed at the position shown in FIG. 2. The gasket was formed from polypropylene. The test was conducted at a room temperature of 20° C. The figures in the table show the pressure values (kg/cm$^2$) at which the gaskets were ruptured. These pressure values are mean values of five test samples.

TABLE 1

| Cell Size | Gasket (A) | Gasket (B) | Gasket (C) |
|---|---|---|---|
| D - size | 45kg/cm$^2$ | 32kg/cm$^2$ | 22kg/cm$^2$ |
| C - size | 49 | 36 | 25 |

*T = 0.60mm
D = 0.35mm
G = 0.25mm

TABLE II

| Cell Size | Gasket (A) | Gasket (B) | Gasket (C) |
|---|---|---|---|
| D - size | 51kg/cm$^2$ | 37kg/cm$^2$ | 28kg/cm$^2$ |
| C - size | 57 | 40 | 30 |

*T = 0.60mm
D = 0.25mm
G = 0.35mm

As it is shown in the above tables, the present sealing gaskets (B) and (C) having the horizontal groove and the vertical groove intersecting with each other could be ruptured by smaller internal gas pressures of less than 40 kg/cm$^2$. Especially, the gaskets (C) having the thickness of 0.25 mm to 0.35 mm at the grooved portion could be ruptured by pressures of less than 30 kg/cm$^2$. This means that the gasket formed by a known injection molding process and having a thickness of about 0.25 mm to 0.35 mm could be ruptured by the abnormal internal gas pressure and allows the release of the gas to the outside of the cell. Thus, the internal gas in the cell will not be developed to such an extent as to cause explosion of the cell.

Although the present invention has been described with reference to a preferred embodiment thereof, many modifications and alterations may be made within the spirit of the invention.

What is claimed is:

1. A rupturable safety sealing gasket for a cell, said gasket comprising:
    a circumferential marginal portion adapted to be constricted between a free end of a metal casing and a peripheral edge of a terminal plate;
    an annular center portion through which a metal collector rod is adapted to extend;
    an intermediate portion integrally connecting said marginal portion with said center portion;
    said intermediate portion including an inwardly projecting annular thin wall surrounding said center portion with a first annular space therebetween and an inwardly projecting annular thick wall having a thickness greater than said annular thin wall and integrally connected to said thin wall at an inner end thereof, said annular thick wall surrounding said annular thin wall to define a second annular space therebetween;

said annular thin wall including a first inner frusto-conical section and a second outer frusto-conical section integrally formed with each other, said first inner frusto-conical section having an imaginary apex angle greater than an imaginary apex angle of said second outer frusto-conical section;

said annular thin wall having in the outer surface thereof a substantially axially extending groove; and said annular thin wall having in said outer surface thereof, at the juncture of said first and second frusto-conical sections, an annular circumferentially extending groove which intersects said axial groove.

2. A rupturable safety sealing gasket as claimed in claim 1, wherein the thickness of said annular thin wall at said grooves is in the range of from 0.25 mm to 0.35 mm.

* * * * *